INVENTORS
JOHN L. KEMMERER JR.
EDWARD G. BUSCHOW

BY

ATTORNEY

Sept. 30, 1969  J. L. KEMMERER, JR., ET AL  3,470,068
METHODS AND APPARATUS FOR THE CONTINUOUS TREATMENT
OF NON-CAKING COAL AND OTHER DISCRETE MATERIALS
Filed Oct. 12, 1966  2 Sheets-Sheet
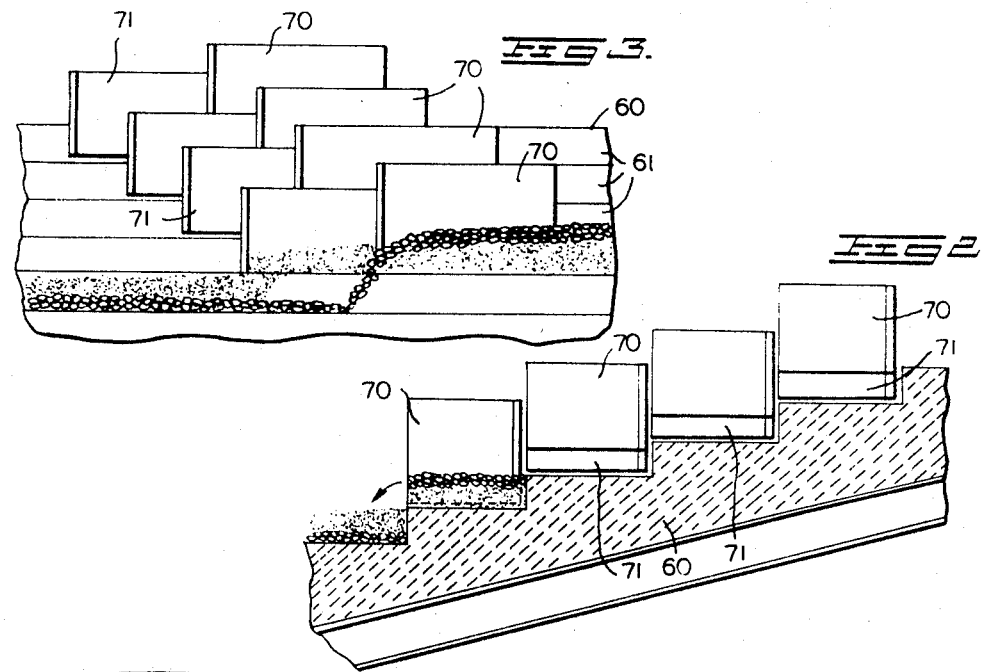
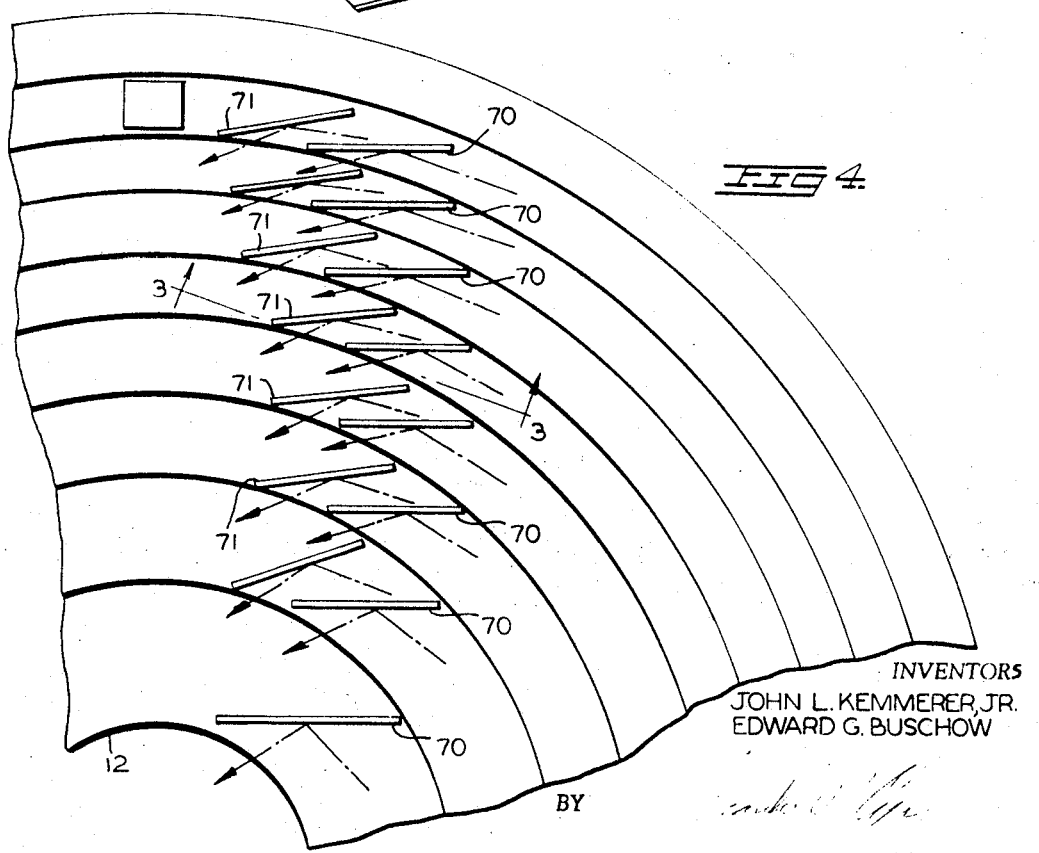
INVENTORS
JOHN L. KEMMERER, JR.
EDWARD G. BUSCHOW
BY
ATTORNEY

United States Patent Office 3,470,068
Patented Sept. 30, 1969

3,470,068
METHODS AND APPARATUS FOR THE CONTINUOUS TREATMENT OF NON-CAKING COAL AND OTHER DISCRETE MATERIALS
John L. Kemmerer, Jr., Short Hills, N.J., and Edward G. Buschow, Pittsburgh, Pa., assignors to Salem-Brosius, Inc., a corporation of Pennsylvania
Filed Oct. 12, 1966, Ser. No. 586,207
Int. Cl. C10b 7/02, 11/00
U.S. Cl. 201—33      4 Claims

ABSTRACT OF THE DISCLOSURE

A method and apparatus for continuously treating non-caking coal and other materials of low non-agglutinating values, consisting in delivering the materials onto a rotating hearth which is stepped or cascaded circularly and radially from its outer periphery at the point of admission of materials thereinto to its center where a soaking pit is provided. A plurality of stationary rabbles are disposed above the hearth and extend downwardly towards the respective steps, said rabbles being coextensive with the width of the steps to insure a full sweep of the material thereon and stirring it as well as advancing it in its progress towards the soaking pit or exit area.

---

This invention relates generally to a method and apparatus for the continuous coking, devolatilizing and/or calcining of carbonaceous materials such as the so-called non-caking coals (coals having a low agglutinating value), anthracite coal, wood products, green petroleum coke, pellets or briquettes containing controlled percentages of bituminous coking coal and other carbonaceous materials or inerts either with or without a bituminous binder. It also relates to the calcining of dolomite, limestone and cement rock, the reclaiming of calcium oxide from carbonate sludge, the decomposition of carbonates, sulphates and chlorides, the reactivation of activated carbon, and the like.

Heretofore, the devolatilizing and calcining above mentioned has normally and generally been done in operations of a batch type. For example, a common method of making coke is the well known vertical shaft coke oven. There are numerous coals that cannot be properly coked by conventional methods and apparatus or, if coked in the conventional way, they yield poor and unsatisfactory products. For example, the coking of bituminous western coals in conventional apparatus yields a notoriously poor product in that the residual volatiles in the product are too high and often unacceptable. This product also lacks uniformity in that volatiles will be driven off to a lesser degree in some portions of the batch than in other portions.

The calcining of green petroleum coke is normally performed in a rotary kiln. The rotation of the kiln tends to degradate the coke particles and a portion of the finer material is blown out the stack with the products of combustion. Furthermore, segregation occurs within the bed of material with the result that the larger particles move freely on the surface and the fines remain in the middle of the bed. This causes the larger particles to be more thoroughly devolatilized than the smaller material.

Batch calcining operations with limestone similarly have shortcomings with regard to uniformity in that they generally produce a dead-burned lime which has a hard shell on the outside of the product pieces that inhibits its ability to slake.

We have invented a method and apparatus for the treatment of such materials that have overcome these problems, which yield a more even and uniform product and for example, yield an excellent coke product from bituminous western coals having retained volatiles of only from .5 to 1.5%, and in treating limestone yield a soft-burned lime which is a desirable product in that it slakes much easier than dead-burned lime.

We provide a method of continuously treating so-called non-caking coal, limestone and other materials of low or non-agglutinating values comprising the steps of continuously delivering the material to be treated onto a hearth in a heated oven chamber adjacent the outer periphery thereof to form a bed thereon, relatively moving the hearth and the material thereon with respect to a plurality of rabbles disposed above the hearth and spaced progressively outwardly from the center thereof, progressively advancing the material toward a material outlet at the center of the hearth by disposing said rabbles such that they extend into the bed at an angle of attack that moves the bed progressively inwardly toward said material outlet, turning said bed over and over during its progressive movement toward the material outlet, and discharging the treated material into the material outlet at the center of the hearth.

In a preferred method of treating such materials, the material is delivered onto a generally circular hearth and the hearth and the material thereon are rotated in opposition to said plurality of rabbles which are stationarily disposed above the hearth. The material is discharged into a soaking pit at the center of the hearth and the treated material is then discharged from the bottom of the soaking pit.

In an apparatus for carrying out our method we provide an oven comprising means constituting a heated chamber, a hearth in the chamber, a material outlet at the center of the hearth, means for delivering material to the hearth adjacent the outer periphery thereof to form a bed of material on the hearth, rabbles disposed above the hearth and means for relatively moving the hearth and rabbles, the rabbles being spaced radially outwardly from the center of the hearth and disposed to move material on the hearth inwardly toward the material outlet upon relative movement between the hearth and the rabbles. While the spacings between the radially arranged rabbles may, if desired, be equal, these spacings may also be such as to vary progressively outwardly from the center of the hearth, increasing inwardly of the hearth to compensate for decrease in the dimensions of the portions of the hearth opposed to the respective rabbles, so as to maintain substantially constant the depth of the bed of material on the hearth.

We provide a generally circular hearth with a soaking pit at the center thereof and means for rotating the hearth and the material thereon in opposition to the rabbles which are stationarily mounted above the hearth, said soaking pit having discharge means at its bottom.

Also, we provide a hearth which is generally sloping toward the center from its outer periphery and provide it with a stepped or terraced configuration to cooperate with the rabbles for the purpose of turning over the bed as it is advanced toward the material outlet, so that the fines are more efficiently exposed to the heat of the hearth.

In still another preferred embodiment, we provide rabbles that are staged such that there is a leading rabble and a following rabble at substantially each spacing of the rabbles, each said following rabble extending deeper into the bed than its respective leading rabble, whereby said bed is advanced progressively inwardly in stages with the upper portion of the bed being progressively advanced prior to the lower portion of the bed to promote a turning over of the bed as it progresses toward the material outlet.

Other details, objects and advantages of the invention will become apparent as the following description of certain present preferred embodiments thereof and certain present preferred methods of practicing the same proceed.

In the accompanying drawings, we have shown certain present preferred embodiments of the invention and have illustrated certain present preferred method of practicing the same in which:

FIGURE 3 is a fragmentary section taken on line 3—3 of FIGURE 4;

FIGURE 4 is a fragmentary plan view of the hearth of FIGURES 2 and 3; and

FIGURE 5 is a partial section of an optional smooth and sloping hearth surface.

Figure 1:
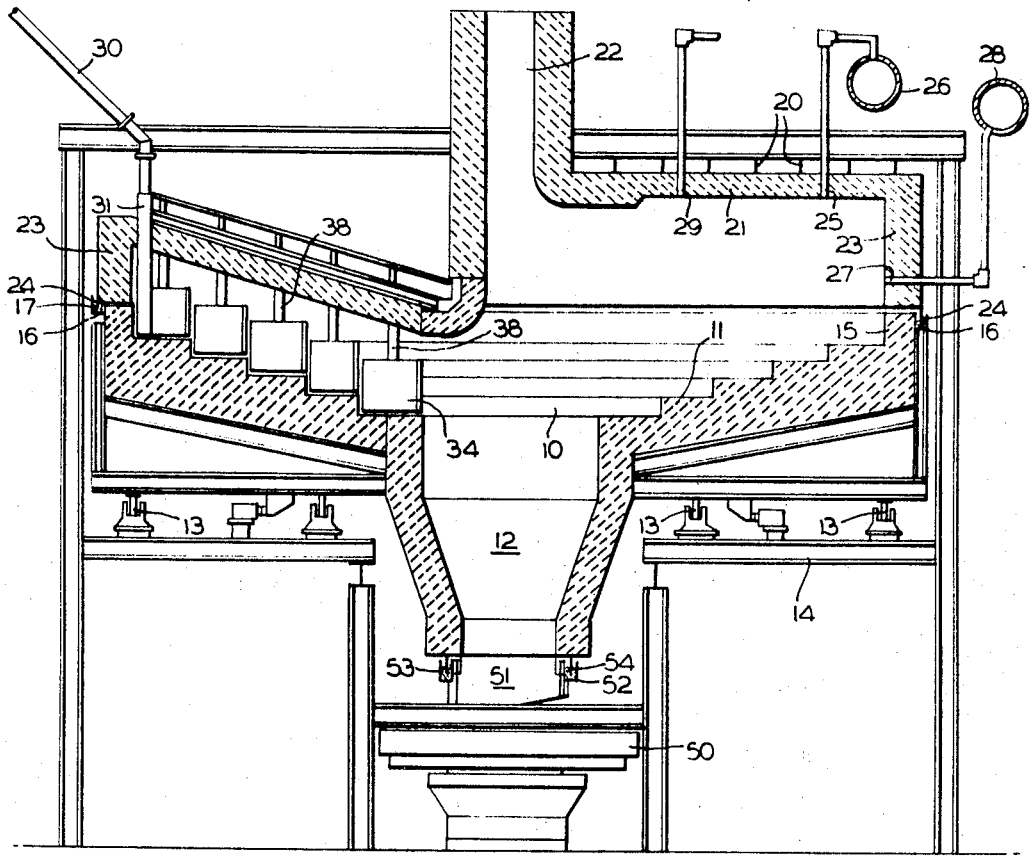
FIGURE 1 is a vertical section through a furnace embodying our invention.

Referring to the drawings, we have illustrated a furnace according to our invention having a rotary hearth 10 with an inner hearth surface 11 sloping from the outer periphery downwardly to a central axially extending soaking pit 12 integral with and depending from the hearth 10. The rotary hearth 10 is supported on spaced rollers 13 mounted on a furnace frame 14 and is driven by a motor and a rack and pinion drive in conventional manner for rotary hearth furnaces. A curb 15 extends vertically above the hearth surface 11 at its outer periphery and carries a trough 16 with sand 17. A liquid may be used instead of sand, if preferred.

The furnace frame 14 carries roof beams 20 which support a refractory roof 21 having a central flue 22. The roof 21 has a depending wall 23 carrying flange 24 which extends into the sand 17 carried in trough 16 forming a rotary sand seal between the roof 21 and hearth 10. The roof 21 is provided with air ports 25 receiving air from duct 26 mounted on the furnace frame 14. The ports 25 direct air downwardly towards the hearth. Sidewalls 23 of the roof are provided with ports 27 receiving air from duct 28 also mounted on the frame 14. The ports 27 direct air generally across the hearth in a radial direction. Burners 29 are provided in the roof to bring the furnace to operating temperature and to provide additional heat for those reactions which are not, or not completely, autogenetic. A feed chute 30 passes through the roof 21 adjacent the sidewall 23 and is provided with a vertically adjustable delivery end 31 extending to a point adjustably selected to deliver a selected thickness of feed onto hearth surface 11.

The rabbles are shown schematically at 34 in FIGURE 1 guided in refractories 38 extending through the roof 21 as more particularly disclosed in the aforesaid patent application.

A rotary discharge table 50 is provided beneath the soaking pit 12 to receive the output of such pit. A fixed discharge spout or plow 51 is mounted in frame 14 between the soaking pit 12 and discharge table 50. The spout 51 is provided with a peripheral trough 52 into which a depending flange 54 on the soaking pit extends to form a seal, 53.

Figure 2:
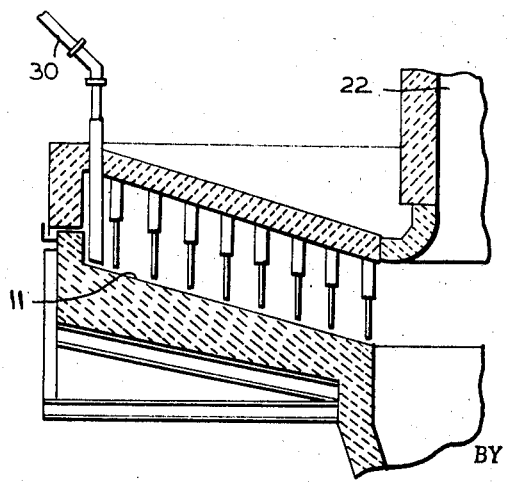
FIGURE 2 is a fragmentary section of hearth and plows according to our invention.

FIGURES 2 and 3 and 4 illustrtrate a stepped or terraced hearth configuration 60 in which concentric rings, here progressively arranged, are defined by vertical surfaces 61 so that the hearth surface 60 consists of a series of steps. We have also illustrated more in detail, the rabbles of FIGURE 1 and have disclosed a rabble arrangement in which the rabbles are arranged one 70 preceding another 71. The first rabble 70 is higher than the second or following rabble 71, so as to remove a top layer from the step and discharge it first to the next lower step, and then by the second rabble, remove a next lower layer which becomes the top of the next succeeding ring. In this manner, several desirable immersions and stirrings of the material is assured. This beneficial action insures that all of the fines which normally would be at the floor level of the respective steps are caused to be removed therefrom and to be exposed to the heat of the furnace gases.

As exemplified in FIGURE 2, the width of the rabbles is coextensive with that of the steps in order to further insure complete transfer of the material from step to step.

In operation, the burners 29 are fired to bring the furnace up to the desired temperature which depends upon the nature of the material being devolatilized or calcined. The material is fed through feed chute 30 and is continuously spread to the desired thickness and width along the outer periphery, of the hearth surface 11. As the hearth rotates, the material encounters the rabbles 70 and 71, each set deflecting material and striking it into the next adjacent concentric ring so that the flow of material from the periphery of the hearth surface to the soaking pit 12 is generally in spiral concentric rings, each of greater width, where progressively arranged, so that as the rings become smaller the area becomes greater and providing a uniform depth. These rings are shown specifically in FIGURE 4.

While we have shown flat quadrangular rabbles, it is possible to have various configurations of rabbles, such, for example, as one having a configuration similar to that of a conventional mold board plow design to turn the material plowed from the concentric ring.

While we have illustrated and described certain presently preferred embodiments of our invention, it will be understood that this invention may be otherwise embodied while remaining within the scope of the following claims.

We claim:

1. A heat treating oven comprising a circular heated chamber having a vertical axis including a roof structure therefor, a hearth in said chamber, concentric steps formed on said hearth to provide a stepped hearth formation, burner means in said chamber to bring the oven to operating temperatures to remove volatile components from materials undergoing treatment therein, a material outlet at the center of said hearth, an outlet for volatile materials, means for delivering materials to the said hearth adjacent the outer periphery thereof to form a bed of materials on said hearth, a plurality of stationary rabbles co-extensive with the width of each of the respective concentric steps mounted in said roof and disposed above each said concentric steps, a leading and a following rabble on said steps, the leading rabble extending to a position closely adjacent said steps, the following rabble being spaced higher than the said leading rabble, means for rotating said stepped hearth formation about said axis relative to said rabbles, said rabbles and said hearth steps being spaced progressing outwardly from the center of the hearth, said rabbles progressing outwardly from the center of said hearth and arranged to move materials on said concentric steps from one step to the next adjacent step towards the material outlet upon relative movement between the hearth and said rabbles, the spacing between the rabbles progressing outwardly from the center of the hearth to the periphery thereof progressively decreasing to compensate for an increase in the radial dimension of the steps of the hearth opposed to the respective rabbles whereby to maintain susbtantially constant the depth of the bed of materials on the concentric steps of the hearth.

2. A heat treating oven as set forth in claim 1 wherein the stepped hearth comprises a plurality of concentric rings, each said concentric ring being of smaller width from the center of the hearth to the periphery thereof.

3. A heat treating oven as set forth in claim 1 wherein the rabbles are arranged such that there is a leading rabble and a following rabble, said following rabble extending deeper into the bed of materials on said concentric steps whereby the leading rabble directs the upper portion of the materials undergoing treatment from on to one of said concentric steps on to the next succeeding lower step and the following rabble directs the remainder of said materials from on to the one said concentric step to the next succeeding lower step.

4. A method of treating materials capable of yielding volatiles under heat treatment comprising the steps of:
(a) delivery materials onto the periphery of a rotating hearth having concentrically formed therein a plurality of steps each of a greater width progressing from the center of the hearth to the periphery thereof and housed within a heated chamber,
(b) rotating the hearth and materials thereon with respect to a plurality of spaced stationary rabbles disposed above the hearth, each step being associated with plural rabbles, a first such rabble being adjacent the step and one other rabble being spaced from the step higher than the first said rabble,
(c) advancing the materials toward the outlet at the center of the hearth by the opposing action of the stationary rabbles with respect to the rotating hearth, and,
(d) during such advance of the materials, subjecting first the upper layer of such materials to be directed onto a next lower concentric step and then subjecting the remainder of the materials on said step to be deposited next onto the next lower cencentric step.

References Cited
UNITED STATES PATENTS

| | | | |
|---|---|---|---|
| 985,053 | 2/1911 | Noad | 202—117 XR |
| 2,676,006 | 4/1954 | Martin | 263—26 |
| 1,878,581 | 9/1932 | Ab-der-Halden | 202—104 |

NORMAN YUDKOFF, Primary Examiner

DAVID EDWARDS, Assistant Examiner

U.S. Cl. X.R.

201—40; 202—117, 218